Figure 1:
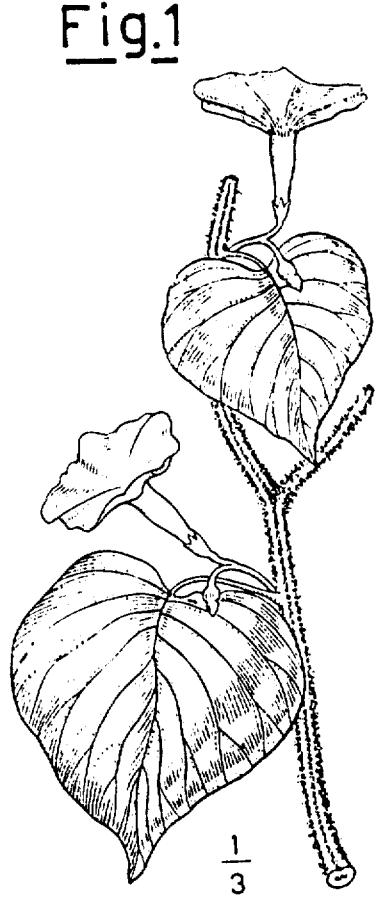

United States Patent [19]
Ferrari

[11] 3,920,663
[45] Nov. 18, 1975

[54] METHOD FOR THE EXTRACTION OF LYSERGOL AND ERGOT ALKALOIDS FROM PLANTS OF THE IPOMOEA GENUS

[75] Inventor: Giorgio Ferrari, Milan, Italy
[73] Assignee: Simes S.p.A., Milan, Italy
[22] Filed: Aug. 14, 1972
[21] Appl. No.: 280,212

[30] Foreign Application Priority Data
Aug. 17, 1971 Belgium .......................... 107138
Jan. 14, 1972 Belgium .......................... 112886

[52] U.S. Cl. ...................... 260/285.5; 260/313.1
[51] Int. Cl.² .................................. C07D 519/02
[58] Field of Search .................... 260/285.5, 313.1

[56] References Cited
UNITED STATES PATENTS

| | | | |
|---|---|---|---|
| 2,114,306 | 4/1938 | Kuessmen | 260/285.5 |
| 2,255,124 | 9/1941 | Moore | 260/285.5 |
| 2,809,920 | 10/1957 | Stoll | 260/285.5 |
| 3,219,545 | 11/1965 | Rutschmann et al. | 260/285.5 |
| 3,224,945 | 12/1965 | Tyler | 260/285.5 |

OTHER PUBLICATIONS
Merck Index, 8th Edition, p. 228 (1968).
Erge et al., Chem. Abstr. Vol. 79, Col. 396006 (1973).
Voigt et al., Die Pharmazie, Vol. 26, pp. 494–503 503 (1971).

*Primary Examiner*—Donald G. Daus
*Attorney, Agent, or Firm*—Shlesinger, Fitzsimmons & Shlesinger

[57] ABSTRACT

A method is disclosed for recovering ergolic alkaloids from the seeds of the Kaladana plant, the latter being a plant of the Ipomoea section of Convolvulaceae, Calonyction genus (Choisy) Hallier f., species nova. The method is a selective extraction with appropriate solvents, in order to recover both lysergol and chamoclavine from the Kaladana seeds. Temperatures and times of treatment are critical and the preferred solvents are chlorinated aliphatic hydrocarbons.

13 Claims, 3 Drawing Figures

METHOD FOR THE EXTRACTION OF LYSERGOL AND ERGOT ALKALOIDS FROM PLANTS OF THE IPOMOEA GENUS

This invention relates to the extraction of alkaloids having an ergolic structure from a plant of the Ipomoea genus. (Convolvulaceae family).

More detailedly, the present invention relates to the extraction and isolation in the pure condition of lysergol and chanoclavine from the seeds of Kaladana, a plant identified by the scientific name Calonyction Ipomoea (Choisy) Hallier f., nova species.

Kaladana is the native name by which is indicated a spontaneous plant of the subtropical mountainous territories, more particularly the pre-Himalayan belt (India), whose scientific classification has been controversial and nonconcordant heretofore.

As a matter of fact in the publication Chopra's Indigenous Drugs of India, U.N. Dhur and Sons Private Limited, Calcutta, 1958, page 51, Kaladana is indicated as corresponding to the scientific term *Ipomoea hederacea* (I.P).

Contrarywise, in J. Pharm. Sc., Vol. 56, page 771, 1967, in the context of an article by Gupta and co-workers, it is affirmed that Kaladana is the name by which *Ipomoea muricata* is commonly known. Lastly, in the "British Pharmaceutical Code 1949," page 459, it is affirmed, conversely, that Kaladana is composed by dried seeds of *Ipomoea hederacea*.

In order to dissipate any possible doubt, it is deemed fitting to describe it more comprehensively.

Kaladana as of interest in the present invention is a plant which certainly belongs to the Convolvulaceae family, section Ipomoeae and genus Calonyction, which exhibits the following features:

A lianous perennial plant having voluble twines which are very long, branch-like, herbaceous but wood-like hardened at the base, furrowed by two longitudinal grooves which are abundantly fitted with short herbaceous thorns, these being slightly curved downwards and having an obtuse apex, non-stinging.

Akin to *C.muricatum* (L) G. Don, it differs therefrom for the leaves which are alternate and chordate-acuminate, neither lobate nor sagittate, having slightly sinuateundulate edges and a greater size: length up to about 25 cms. and width up to 22 cms., the petiole being long from ½ to ⅓ the length of the leaf, shortly expanded at the base and scarcely hairy there.

The flowers are in number of 2 – 3 on an axillar peduncle; the corol is elongate conical tubular, whitish, having a length shorter than that of *C.muricatum* (about 7 cms.), funnel-like rotated edge, which is obtusely pentalobate and has a diameter of about 8 cms., the colour being lilac or rosy, more or less dark, which opens at night time; stamina and stylus do not protrude from the corol tube, the calix has acuminate and applicate lobes, which however become enlarged until becoming ovate-acuminate and slightly divergent as the capsule ripens.

The capsule is pendulous, ovate-apiculate having three (from two to four) black seeds in the form of a clove (outer face ovoidal and the internal faces planar), minutely tomentous-granulous, long 7 mms. as an average and wide 6 mms.

As to its habitat, the plant is spontaneous in the mountainous pre-Himalayan belt of India and Pakistan (East), up to an altitude of 1500 meters. The drug, consisting of the seeds, is locally used for its aperient action, whereas the powder is used as an antipyretic.

Figure 2:
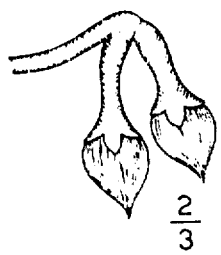

In the accompanying drawings, which show Kaladana, there are shown:

In FIG. 1 a twine of the plant under discussion with leaves and flowers;

In FIG. 2 the seed-carrying capsulae when ripened, and

Figures 3, 4:
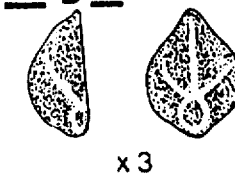

In FIGS. 3 and 4 the front and side views of a seed, respectively.

It has now been found that this plant, and more particularly its seeds, are particularly rich with ergolic alkaloids and these can be usefully extracted by a method which is comparatively simple and allows, inter alia, to obtain them in a pure condition.

According to the invention, the Kaladana seeds are ground until obtaining a flour. The ground drug is subsequently exhausted in the cold with gasoline or light naphtha in order to remove all the fat portions. The operation is repeated until complete exhaustion is obtained, that which is achieved by repeating the operation three or four times.

The fat-stripped drug is then subjected to an extraction with appropriate solvents for withdrawing the active principles. Especially useful to this end are the halogen substituted aliphatic hydrocarbons such as chloroform, carbon tetrachloride, methylene chloride and so forth. In order to facilitate the extraction, the halogen substituted aliphatic hydrocarbon can be supplemented by a small percentage of a low molecular weight aliphatic alcohol and a small amount of an hydroxide. Alcohols such as methanol, ethanol, isopropanol and hydroxides such as ammonia are very well suited to this purpose. The amounts of alcohol added can attain 15% whereas the alkali metal bases can reach 5% by volume with respect to the chlorinated hydrocarbon. The extractions of the material are carried out, preferably, at a temperature comprised between 10°C and 50°C. The number of extractions which are required for a complete exhaustion of the alkaloids of the drug is from three to five.

The extracts as obtained are subsequently evaporated to a volume which is approximately equal to one tenth of the original one at a temperature of 30°C and under subatmospherical pressures and allowed to stand a few days at 0°C–4°C. The mass which separated after this stay is removed by filtration. The precipitate cake, in turn, is slurried in ten times its weight of water and the portion which is insoluble is dissolved in methanol and combined with the filtrate. The filtrate is washed with water.

From the organic phase, which is washed with water, the extraction of ergolic alkaloids is proceeded with by using aqueous solutions of acids. It has been found that the aqueous diluted solutions of phosphoric acid lend themselves very well to the task. The extraction of the organic phase with aqueous solutions of acids is continued until the Ehrlich alkaloid test becomes negative.

From the combined acidic extracts, which are made weakly alkaline with a base (preferably aqueous ammonia), the alkaloids are extracted again with a mixture of an aliphatic chlorinated hydrocarbon and an aliphatic alcohol. A mixture of chloroform and methanol in the ratio of 7:3 by volume proved to be particularly satisfactory.

The extractions are repeated until the Ehrlich test is negative. The combined extracts are washed once with water, dried over anhydrous sodium sulphate and then evaporated to dryness at a temperature below 30°C under subatmospherical pressures. The residue is formed by the alkaloid fraction of Kaladana, that is Ipomoea Calonyction (Choisy) Hallier f. nova species and, when examined in thin-layer chromatography, by using as the solvent substance methylene chloride-methanol-benzene (25:5:5) and as the detector a 3% solution in alcohol of vanillin and 0.5% by volume of concentrated sulphuric acid, after activation at 110°C - 120°C during 5 minutes, exhibits the presence of several ergolic alkaloids, among which lysergol predominates, and, secondly, chanoclavine.

It has been found that lysergol can be isolated by the total alkaloids by merely washing the mass with a low molecular weight aliphatic alcohol such as methanol, and makes up the residue which is insoluble in the cold. Such a residue, upon filtration, can be further purified by crystallization from an appropriate organic solvent, or also from a mixture of dimethylsulphoxide and water. Lysergol is especially well purified by repeated crystallizations from dimethylsulphoxide-water in the ratio of 1:1; the product thus obtained exhibits the following properties: the percentage analysis corresponds to the raw formula $C_{16}H_{18}ON_2$.

C% Calcd. 75.55; H% Calcd. 7.14; N% Calcd. 11.02.
Found: 75.39; Found: 7.22; Found: 10.96.

mol.wt. 254.3; m.p. (crystallised from alcohol) 253°C-255°C. (decomp.). $[\alpha]_D^{20}$ = +54° (c=0.3 in pyridine).

According to another aspect, the present invention provides for the further isolation of chanoclavine from the residue which contains the total ergolic alkaloids, upon isolation of lysergol. To this end the present invention provides for the further steps of:

a. evaporation to dryness, in a vacuo and at a temperature below 60°C, of the mother liquors which are left after the extraction of lysergol;

b. dissolution of the residue in an excess of pyridine and addition of acetic acid anhydride in an amount by weight equal to that of the dried residue, allowing the mixture to stand during 24 hours;

c. precipitation of the chanoclavine diacetate by pouring the reaction product obtained in an excess of water and ice, and d. purification of the chanoclavine diacetate (raw) after drying by recrystallization from ethyl acetate.

The thusly obtained chanoclavine diacetate has the following properties:

melting point 172°C-173°C — $[\alpha]_D^{20}$ −53.4° (c=0.95 in pyridine); $[\alpha]_D^{20}$ −58° (c=1% in chloroform).
I.R. spectrum in CHCl₃ characteristic absorption bands at 1625 cm⁻¹ (N—COCH₃); 1730 cm⁻¹ (O—COCH₃) — U.V. spectrum in MeOH + 1% CHCl₃: λ max 283 nm (log ε 3.81); 216 nm (log ε 4.76); 291 nm (log ε 3.78).

Analysis for $C_{20}H_{24}O_3N_2$ (340.4)
Calcd. C% 70.6; H% 7.1; N% 8.2.
Found: 70.3; 7.15; 8.3.

As regards the stages of the method outlined above, it should be recalled that:

1. The dry residue as obtained upon evaporation of the mother liquors combined of the lysergol extraction, is weighed and dissolved, preferably in about three times its weight of anhydrous pyridine;

2. The excess of water and ice for the precipitation of chanoclavine diacetate is about ten times the volume of the reaction product of the stage(b);

3. The precipitate of chanoclavine diacetate (raw) is separated by filtration upon repeated washings with water and then purified.

The lysergol obtained according to the present invention, it has been found, exhibits interesting phsiological properties which manifest themselves on the test animals on different systems and especially on the nervous system and the circulatory system. The substance, in very low dosages, acts as a hypotensive which is particularly active as to its effect on the peripheral circulatory system. The substance exhibits considerable psychotropic properties with antiserotonin effects. The substance exhibits pronounced analgesic properties. Lastly, the stimulating effect on isolated organs, such as uterus and intestine, is considerable. Lysergol, on account of these features can find a useful application in the therapeutics for different pathological situations. To this end it could be formulated in an appropriate manner, as such, or in the form of soluble salts with appropriate excipients suitable for both parentheral and oral use.

Examples are now given by way of example only and without any limitation.

EXAMPLE 1

40 kgs. of Kaladana seeds are ground in a mill so as to obtain a flour having a size of from 40 to 60 meshes per cm.

The ground drug is exhausted in the cold condition in an extractor equipped with a stirrer, five times with gasoline having a boiling point of 80°C - 90°C. 150 liters of solvent are employed each time. Every extraction step takes three hours with stirring. The defatted drug, upon complete removal of the gasoline, is extracted in the same apparatus twice with a mixture of chloroform-methanol-ammonia in the ratios 9:0.9:0.1. 160 liters of the mixture are employed.

Subsequently, the mass is extracted three additional times with chloroform only (100 liters).

The combined extracts are evaporated under subatmospherical pressures at a temperature below 30°C until obtaining a volume of 25 liters.

The concentrate is allowed to stand in a refrigerator at 0°C - 4°C during two days. The solid which has been separated is collected by filtration with a suction pump and the cake is dried under vacuum. The dried cake (300 to 400 grams) is slurried cold in 10 times its weight of water and stirred during one hour. Filtration is repeated and the water insoluble residue is dissolved in thrice its weight of methanol; the methanol solution being added to the main filtrate. The filtrate is now washed with 6 liters of water in a separator. The organic phase is then further evaporated until a volume of eight liters is attained, in a vacuo and at a temperature below 30°C. This concentrate is exhausted by extracting it four times with a 5% solution of phosphoric acid. There is employed, in total, eight liters of the acidic solution. The combined acidic extracts are made slightly alkaline with aqueous ammonia until reaching a pH of 8 and are exhausted by extracting them with a chloroform-methanol mixture in the ratio 7:3. Four extractions are carried out by employing, as a total, 8 liters of the mixture.

The organic extracts are washed once with water, then they are dried over anhydrous sodium sulphate and evaporated to dryness, under subatmospherical pressures at a temperature below 30°C.

The residue (200 to 270 grams) as formed by the total ergolic alkaloids of the drug has the composition indicated in the introductory part hereof and is now stirred in the cold with 500 grams of methanol during 1 hour. The insoluble portion is collected on a filter and dried in a vacuo.

The further purification of the insoluble fraction (lysergol) is carried out by dissolving the raw product in an equal amount by weight of dimethylsulphoxide, by heating gently on a water bath. The solution is treated with decolorizing charcoal, filtered carefully and the filtrate is supplemented with an equal volume of distilled water. Then it is allowed to stand for crystallizing. The crystallizate is separated by filtration and dried in a vacuo to constant weight.

The operation is repeated until obtaining a product having the properties as indicated in the introduction hereof.

EXAMPLE 2

The methanolic mother liquors as obtained from the washing of the ergolic total alkaloids of Example 1 are placed in a rotary evaporator and the solvent is continuously removed in a vacuo to dryness at a temperature below 60°C. The residue (70–90 grams) is taken up with anhydrous pyridine (210 – 270 mls.) and the solution is supplemented with acetic acid anhydride (70–90 mls.).

The mass, sheltered from moist air, is allowed to stand during 24 hours. Subsequently is poured over water and ice (2000 – 2200 mls.). The product which separates is allowed to stand and is repeatedly washed with water.

It is then filtered under vacumm, dried and recrystallized from ethyl acetate. (30 – 45 grs.). The thusly obtained chanoclavine diacetate is pure when examined in thin layer chromatography on a Kieselgel GF$_{254}$ layer (Type 60) by using methylene chloride-benzene-methanol 25/5/5 as the solvent and vanillin and sulphuric acid as the reagent.

What is claimed is:

1. A method for the preparation of lysergol and ergolic alkaloids comprising the steps of extracting these alkaloids with a solvent from the seeds of the plant Kaladana, that is, a plant of the family Convolvulaceae, section of Ipomoeae, genus Calonyction (Choisy) Hallier f. nova species, and concentrating the extract.

2. A method according to claim 1, wherein the seeds of the plant are ground to a flour and fat-stripped and then extracted with a halogen-substituted aliphatic hydrocarbonaceous solvent selected from the group consisting of chloroform, carbon tetrachloride, and methylene chloride, and at a temperature from 10°C to 50°C, the extraction step being repeated from 3 to 5 times.

3. A method according to claim 2, wherein the solvent is supplemented by an amount, not exceeding 15% by volume with respect to the solvent, of a low molecular weight aliphatic alcohol selected from the group consisting of methanol, ethanol and isopropanol, and an alkali metal in an amount, not exceeding 5% by volume with respect to the solvent.

4. A method according to claim 2, wherein the solvent is supplemented by a liquid selected from the group consisting of methanol, ethanol and isopropanol and ammonium hydroxide.

5. A method according to claim 3, wherein the extracts are combined and concentrated to one tenth of their original volume at a temperature below 30°C under sub-atmospheric pressure, are allowed to stand a few days at 0°C – 4°C and subsequently filtered, the filtrate is washed with water, the filtrate is made alkaline, and is extracted with an aqueous acidic solution, to separate the ergotic alkaloids from the combined acidic extracts, said latter extraction being continued until the Ehrlich alkaloid test is negative, the alkaloids are extracted again with a mixture of a chlorinated aliphatic hydrocarbon and an aliphatic alcohol, the new extraction being continued until said Ehrlich test is negative again, and the combined extracts, washed once only with water and dried over anhydrous sodium sulphate are evaporated to dryness at a temperature below 30°C under subatmospheric pressure, forming a residue composed of the alkaloid fraction of the extracted plant, in which lysergol predominates.

6. A method according to claim 5, wherein said aqueous acidic solution is a solution of phosphoric acid.

7. A method according to claim 5, wherein said mixture for the second extraction stage is a mixture of chloroform and methanol in the respective volume ratio of 7:3.

8. A method according to claim 5, wherein the acidic extracts are made alkaline with aqueous ammonia before the second extraction stage.

9. A method according to claim 5, wherein lysergol is isolated from said residue by washing with a low molecular weight aliphatic alcohol, such as methanol, filtered, and further purified by crystallization with a solvent selected from the group consisting of organic solvents and a mixture of dimethylsulphoxide and water in a 1:1 ratio.

10. A method for the extraction of chanoclavine, wherein the mother liquors, which are left from the lysergol isolation step as claimed in claim 7, are evaporated to dryness under vacuum and at a temperature below 60°C, the dry residue being dissolved in an excess of anhydrous pyridine, and acetic acid anhydride is added thereto in an amount by weight equal to that of the residue, the reaction mixture being allowed to stand during 24 hours, the chanoclavine diacetate being precipitated by pouring the mixture as obtained from the reaction in an excess of water and ice, the raw chanoclavine diacetate being purified after drying it, by recrystallization from ethyl acetate.

11. A method according to claim 10, wherein the excess of anhydrous pyridine is about three times the weight of the dry residue.

12. A method according to claim 10, wherein the excess of water and ice is about ten times the volume of the reaction product.

13. A method according to claim 1, wherein a fraction of the plant is dissolved in a halogen substituted aliphatic hydrocarbon solvent, the extract is evaporated and filtered, the filtrate is then extracted with an aqueous acidic solution, the acidic extract is then made slightly alkaline, and the alkaloids so formed are again extracted with a mixture of an aliphatic chlorinated hydrocarbon and an aliphatic alcohol, and then washed and dried.

* * * * *